(12) United States Patent
Stehmeier et al.

(10) Patent No.: US 8,387,994 B2
(45) Date of Patent: Mar. 5, 2013

(54) SURFACE SEAL AS WELL AS METHOD FOR PRODUCING SEALED JOINTS WITH THIS SURFACE SEAL

(75) Inventors: Heiner Stehmeier, Bremen (DE); Thomas Beumler, Jork (DE)

(73) Assignee: Airbus Operations GmbH (DE)

( * ) Notice: Subject to any disclaimer, the term of this patent is extended or adjusted under 35 U.S.C. 154(b) by 30 days.

(21) Appl. No.: 12/223,216

(22) PCT Filed: Jan. 23, 2007

(86) PCT No.: PCT/EP2007/000553
§ 371 (c)(1),
(2), (4) Date: Dec. 2, 2009

(87) PCT Pub. No.: WO2007/085421
PCT Pub. Date: Aug. 2, 2007

(65) Prior Publication Data
US 2010/0084819 A1  Apr. 8, 2010

(30) Foreign Application Priority Data
Jan. 24, 2006  (DE) .......... 10 2006 003 160

(51) Int. Cl.
*F16J 15/10* (2006.01)
(52) U.S. Cl. .......... 277/640; 277/638; 244/133
(58) Field of Classification Search .......... 277/638, 277/640; 403/267; 244/131, 132, 133
See application file for complete search history.

(56) References Cited

U.S. PATENT DOCUMENTS 2,140,672 A * 12/1938 Gray et al. .......... 156/92
2,228,779 A *  1/1941 Pavlecka et al. .......... 52/394
(Continued)

FOREIGN PATENT DOCUMENTS

EP  0 181 168 A1  5/1986
EP  0 775 736 A1  5/1997
(Continued)

OTHER PUBLICATIONS

International Search Report issued on May 29, 2007 in connection with corresponding International Appln. No. PCT/EP2007/000553.

(Continued)

*Primary Examiner* — Jennifer H Gay
*Assistant Examiner* — Blake Michener
(74) *Attorney, Agent, or Firm* — Lerner, David, Littenberg, Krumholz & Mentlik, LLP

(57) ABSTRACT

A surface seal for sealing a riveted and/or screwed joint between a first and a second component of an aircraft. The surface seal is arranged in the region of joining surfaces of the first and the second component. The surface seal is formed with a pressure-resistant plastic film that is provided with a pressure-sensitive adhesive layer on both sides. The surface seal 1 may furthermore comprise elements for detecting cracks.
A method for producing a riveted and/or screwed joint between a first and a second component of an aircraft is also provided, with the joint being sealed with the surface seal.

11 Claims, 2 Drawing Sheets

U.S. PATENT DOCUMENTS

| | | | | |
|---|---|---|---|---|
| 2,677,633 A * | 5/1954 | Gross | | 277/316 |
| 3,020,185 A * | 2/1962 | Moffitt, Jr. et al. | | 428/365 |
| 3,022,870 A | 2/1962 | John et al. | | |
| 3,077,638 A * | 2/1963 | Hickam | | 264/259 |
| 4,046,933 A * | 9/1977 | Stefanik | | 428/81 |
| 4,086,378 A * | 4/1978 | Kam et al. | | 428/34.5 |
| 4,328,061 A * | 5/1982 | Off et al. | | 156/353 |
| 4,960,631 A * | 10/1990 | Walters et al. | | 428/192 |
| 5,087,644 A * | 2/1992 | Tsutsumi et al. | | 523/205 |
| 5,126,185 A * | 6/1992 | Forrest et al. | | 428/157 |
| 5,662,293 A * | 9/1997 | Hower et al. | | 244/133 |
| 5,803,406 A * | 9/1998 | Kolodziej et al. | | 244/171.7 |
| 6,022,914 A | 2/2000 | Nowak et al. | | |
| 6,086,709 A * | 7/2000 | Hills | | 156/293 |
| 6,320,118 B1 | 11/2001 | Pridham et al. | | |
| 6,451,398 B1 * | 9/2002 | Sylvester | | 428/41.8 |
| 6,595,525 B2 * | 7/2003 | Schmidt | | 277/630 |
| 6,915,987 B2 * | 7/2005 | Fisher et al. | | 244/129.3 |
| 7,182,291 B2 * | 2/2007 | Westre et al. | | 244/119 |
| 7,708,281 B2 * | 5/2010 | West | | 277/312 |
| 7,761,973 B2 * | 7/2010 | Toback | | 29/525.13 |
| 2003/0230859 A1 * | 12/2003 | Hisano et al. | | 277/610 |
| 2004/0140057 A1 | 7/2004 | Burmann et al. | | |
| 2005/0073111 A1 * | 4/2005 | Herpin et al. | | 277/590 |
| 2005/0112348 A1 | 5/2005 | Schmidt et al. | | |
| 2005/0144874 A1 | 7/2005 | West et al. | | |
| 2006/0159513 A1 | 7/2006 | Breuer et al. | | |

FOREIGN PATENT DOCUMENTS

| | | |
|---|---|---|
| EP | 0 872 531 A1 | 10/1998 |
| EP | 1 440 928 A1 | 7/2004 |
| EP | 1 674 541 A1 | 6/2006 |
| JP | 63135479 A | 6/1988 |
| JP | 09176591 A | 7/1997 |
| JP | 2002079584 A | 3/2002 |
| JP | 2003105298 A | 4/2003 |
| RU | 2220181 C1 | 12/2003 |
| WO | 99/51494 A1 | 10/1999 |

OTHER PUBLICATIONS

Office Action from Russian Application No. 2008134329/06(043484) dated Feb. 10, 2011.

* cited by examiner

SURFACE SEAL AS WELL AS METHOD FOR PRODUCING SEALED JOINTS WITH THIS SURFACE SEAL

RELATED ART

This application claims the benefit of the filing date of the German Patent Application No. 10 2006 003 160.1 filed Jan. 24, 2006, the disclosure of which is hereby incorporated herein by reference.

FIELD OF THE INVENTION

The invention relates to a surface seal for sealing a riveted and/or screwed joint between a first and a second component of an aircraft, wherein the surface seal is arranged in the region of joining surfaces of the first and the second component.

The invention furthermore relates to a method for producing a riveted and/or screwed joint between a first and a second component of an aircraft, wherein the joint is sealed, in particular, with a surface seal.

BACKGROUND OF THE INVENTION

All riveted joints of aircraft plankings are usually provided with a seal. Seals are furthermore provided on all joints in the region of the cabin pressure dome, the pressurized floor, the pressure bulkheads as well as the connections between the support bars and the frames. In order to produce such a joint, a sufficiently viscous sealant is applied or laid on, for example, on the joining surface of a first component. Subsequently, a second component to be joined with the first component is placed on the joining surface of the first component with its joining surface and, if so required, aligned and fixed with the aid of additional fixing means. Bores are ultimately produced in the region of the joining surfaces and the components are respectively riveted or screwed together.

However, the sealant is subjected to substantial compressive loads during the riveting or screwing process such that the sealant is partially or even entirely displaced in the region around the bore edges. This means that a damping sealant is no longer present between the joined components in these zones. On the contrary, the joining surfaces of the components rather rub against one another in an unprotected fashion, thereby possibly leading to certain phenomena such as fretting corrosion and premature crack initiation (fatigue symptoms) on the bore edges. Through this, the durability of the joint may be reduced.

SUMMARY OF THE INVENTION

There may be a need to provide a surface seal, as well as a method for producing riveted and/or screwed joints between components by using an inventive surface seal, in which the aforementioned disadvantages may be eliminated.

This need may be met by a surface seal with the features of Claim 1.

Displacements of the surface seal may be largely prevented in the region of the bore edges while the riveted and/or screwed joint between the components to be joined is produced, namely because the surface seal (Flächendichtung) is realized with a pressure-resistant plastic film that is provided with an adhesive layer on both sides. This may prevent fretting corrosion between the components as well as premature fatigue phenomena resulting thereof in the region of bore edges of the components.

The utilization of the inventive surface seal may improve the durability of the joint. Furthermore, the self-adhesive properties of the inventive surface seal may make it possible to pre-fix the surface seal without auxiliary elements such as, for example, centering pins, fitting pins or the like. In comparison with methods in which a viscous sealant is brushed on in the region of the joining surface, the application of the surface seal may also reduce the assembly time.

In addition, the quality of the novel surface seal may not be influenced by the clamping forces, the intensity of which varies when using different types of rivets and/or screws. The constant layer thickness of the plastic film used for the surface seal may also ensure a homogenous dynamic/mechanical load transmission of a joint produced by the inventive surface seal.

According to an exemplary embodiment of the inventive surface seal, the plastic film is substantially realized in a strip-shaped fashion.

This may allow a simple application along the joining surfaces of the components to be joined. Furthermore, the surface seal may also be stored in roll form and may be unrolled from a supply roll before it is applied.

According to another exemplary embodiment, the pressure-sensitive adhesive layers are respectively provided with a thin-layered protective film.

This may make it possible to prevent a sticking together of the surface seal that is stored, for example, in roll form.

According to another exemplary embodiment, the surface seal has an essentially constant layer thickness of less than 1 mm and a width of less than 100 mm.

At a layer thickness of less than 1 mm, a reliable seal between the components to be joined may still be ensured, particularly also in areas in which the unevenness is more significant. A width of up to 100 mm may ensure a sufficient coverage in the overlapping region of the components to be joined by the joint.

According to another exemplary embodiment, the plastic film is formed with polyimide.

This may ensure a sufficient resistance to pressure of the surface seal such that no significant displacement of the surface seal, due to the compressive effect of the riveted and/or screwed joint being produced between the components, may take place at the bore edges. The plastic film may also be formed with plastic materials other than polyimide, for example, PTFE, polycarbonate or the like. The plastic film may furthermore comprise a fiber reinforcement.

According to another exemplary embodiment, the plastic film comprises elements for detecting cracks.

Due to this measure, the inventive surface seal may not only fulfill a sealing function, but also may make it possible to detect the formation of fatigue cracks beforehand such that possibly required countermeasures may be initiated in a timely fashion.

The need may also be met with a method according to Claim 7 that comprises the following steps:
cleaning the first and the second component in the region of the joining surfaces,
removing the protective film from one of the pressure-sensitive adhesive layers,
applying the surface seal in the region of the joining surface of the first component,
removing the protective film from the other pressure-sensitive adhesive layer,
aligning and positioning the components on top of one another such that both components are adhesively joined, and
final joining of the components by riveting or screwing.

Displacements of the surface seal in the region of the joining surfaces of the components to be joined may be largely prevented when the rivets and/or screws are tightened so that no fretting corrosion phenomena may occur that, in turn, could lead to fatigue cracks in the region of the rivets and/or screws used for joining the components and therefore to a reduced durability of the surface seal. Since the components are pre-fixed by using the self-adhesive surface seal before they are riveted and/or screwed together, it may also be no longer necessary to realize an alignment by fitting pins, guide pins or the like.

According to another exemplary embodiment, the surface seal is firmly pressed on with the aid of a pressing roller after it is applied on the first component.

This may make it possible to press out air inclusions that may be situated underneath the surface seal.

According to another exemplary embodiment of the inventive method, respective sealing joints (Dichtfugen) are produced in the region of the component edges. In this embodiment, a lateral admission of water into the surface seal may be prevented so that the joint produced in accordance with the inventive method may be hermetically sealed on all sides, particularly relative to atmospheric influences, condensation water or the like.

According to another exemplary embodiment of the inventive method, the first and the second component are fixed by using a clamping device after they are placed on top of one another, wherein the clamping device may build up a uniform pressure at least in the region of the joining surfaces in order to possibly achieve an adequate adhesion. By that an intimate bond and adhesion between the components lying on top of one another may already be achieved beforehand in the region of the joining surfaces due to the pressure-sensitive adhesive layers. The compression by a clamping device may not be absolutely imperative. A sufficient pressing force may also be built up, for example, by tightening the riveted and/or screwed joints.

SHORT DESCRIPTION OF THE DRAWINGS

DETAILED DESCRIPTION OF EXEMPLARY EMBODIMENTS

Identical constructive elements are respectively identified by the same reference symbols in the figures.

Figure 1:
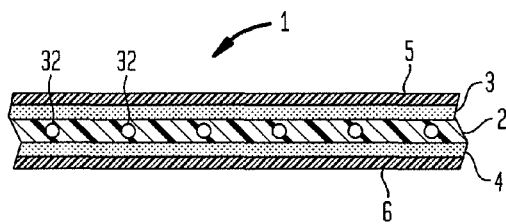
FIG. 1 shows a longitudinal section through a surface seal according to an exemplary embodiment of the invention.

FIG. 1 shows a longitudinal section through surface seal 1 according to an exemplary embodiment. The surface seal 1 comprises, among other things, a pressure-resistant plastic film 2 that is provided with pressure-sensitive adhesive layers 3, 4 on both sides. The pressure-resistant plastic film 2 including its pressure-sensitive adhesive layers 3, 4 preferably have a layer thickness of less than 1 mm, a width of preferably less than 100 mm and an arbitrary (endless) length. The pressure-sensitive adhesive layers 3, 4 are respectively provided with a thin-layered protective film 5, 6 that can be removed from the pressure-sensitive adhesive layers 3, 4. The surface seal 1 is arranged in the region of a joint between two components that need to be joined by rivets and/or screws in order to produce a hermetic seal.

The pressure-resistant plastic film 2 is formed, for example, with a pressure-resistant plastic material such as, for example, polyimide. When the components are joined by a riveted or screwed joint, this measure ensures that essentially no displacement of the surface seal 1 takes place in the region of the edges of the bores of the rivets or screws, wherein said displacement could result in so-called fretting corrosion between the components that directly adjoin one another in this region. Fretting corrosion between the components, in turn, can respectively lead to the initiation of cracks in the region of the bore edges or to fatigue cracks.

The surface seal 1 is intended, in particular, for sealing up joints in the region of aircraft plankings, (aluminum sheets), joints on the cabin pressure dome, on the pressurized floor and on the pressure bulkheads, as well as the connections between the support bars and the frames.

Alternatively, the plastic film 2 may be formed with any sufficiently pressure-resistant plastic material such as, for example, PTFE, polycarbonate or the like that can be provided with a pressure-sensitive adhesive layer. In addition, the pressure-resistant plastic film 2 may be provided with a fiber reinforcement in order to reduce flowing of the plastic film 2 under high pressure.

Figure 2:
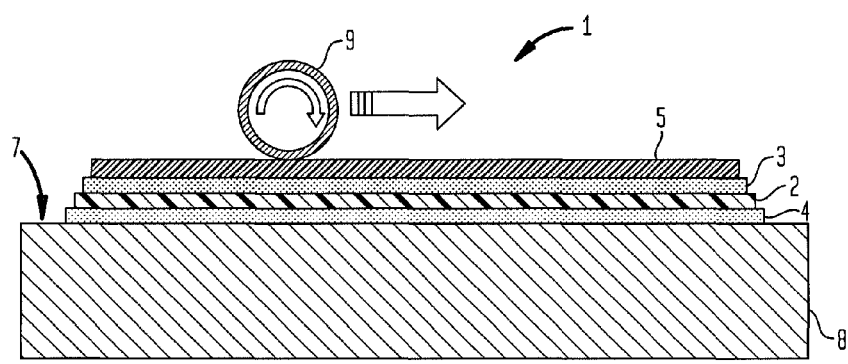
FIG. 2 shows a longitudinal section through a first component with a surface seal applied thereon.
Figure 3:
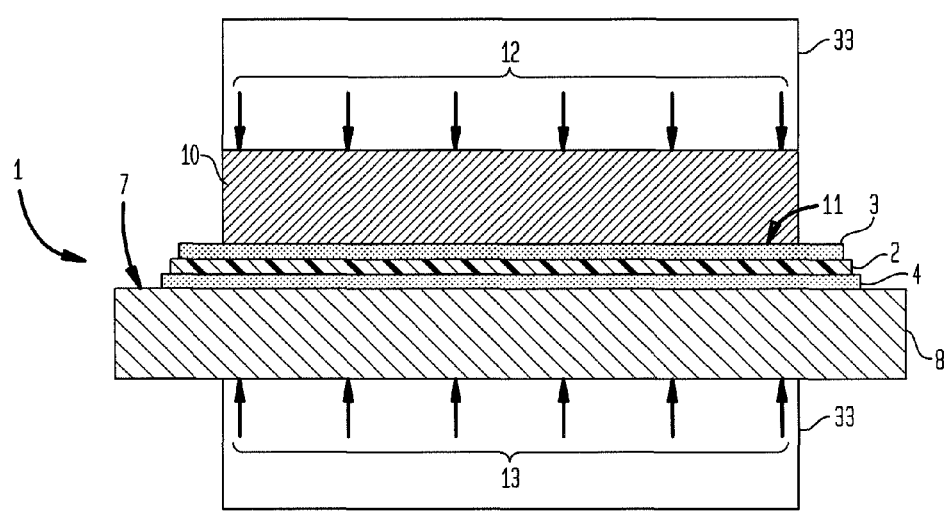
FIG. 3 shows a longitudinal section through a second component that is bonded to the first component, as well as the surface seal lying therebetween.
Figure 4:
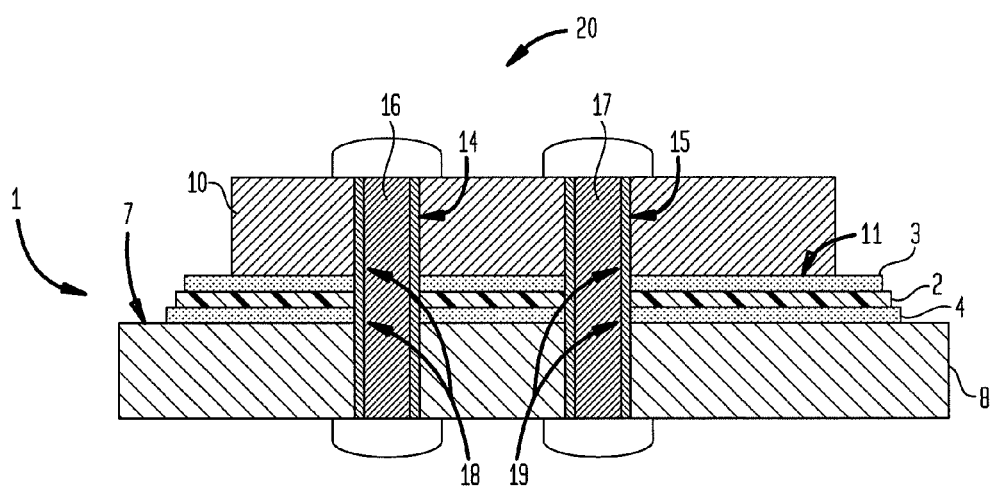
FIG. 4 shows a longitudinal section through the components and the surface seal lying therebetween after the riveted (screwed) joint is finished.

In the following portion reference will be made to FIGS. 2 to 4 in order to illustrate the processing sequence for producing a sealed riveted and/or screwed joint between two components by using the surface seal according to an exemplary embodiment. In FIGS. 2 to 4, the pressure-resistant plastic film 2, the pressure-sensitive adhesive layers 3, 4 as well as the protective films 5, 6 are illustrated slightly offset relative to one another in order to provide a better overview.

For improving the adhesion a joining surface 7 of a first component 8 is initially subjected to a thorough pre-treatment in the form of an intensive cleaning process. The cleaning may be performed by grinding, chemical processes or the like, for example. Subsequently, the protective film 6 is removed from the pressure-sensitive adhesive layer 4. The surface seal 1 is then applied on the joining surface 7 of the first component 8. In order to simplify the handling of the surface seal 1, it may be stored, for example, in roll form and unrolled from a supply roll in order to be applied on the first component 8.

In order to remove possible air inclusions underneath the surface seal 1 the surface seal 1 is firmly pressed against the joining surface 7 by a pressing roller 9 or another equally acting tool as shown in FIG. 2.

Subsequently, an anew cleaning of the joining surface 7 of the first component 8 may be performed, if applicable. Afterwards, a second component 10 having a joining surface 11 is pressed on the pressure-sensitive adhesive layers 3 of the surface seal 1 by using high pressure (cf. FIG. 3). In this connection it is assumed that the joining surface 11 of the second component 10 also was subjected to a thorough cleaning.

In order to improve the quality and the workmanship of the joint to be produced between the first and the second component 8, 10, the first and the second component 8, 10 may, if so required, be subjected to a uniform and sufficiently intense surface pressure (surface load) at least in the region of the joining surfaces 7, 11, i.e., particularly in the region of the surface seal 1 as indicated by the directional arrows 12, 13.

Clamping devices 33 that are not illustrated in great detail in the figures are required for realizing such a uniform surface pressure in the region of the joining surfaces 7, 11. However, the clamping or compressing of the components 8, 10 by using a clamping device 33 or the like is purely optional and consequently not absolutely imperative for carrying out the inventive method. A sufficient pressing force can be generated, for example, by tightening the riveted and/or screwed joints between the first and the second component.

In the processing stage shown in FIG. 3, the components 8, 10 are already sufficiently aligned and fixed relative to one another by the self-adhesive surface seal 1 in connection with the clamping device so that auxiliary elements, for example fitting or centering pins, are no longer required for finishing the joint between the components 8, 10 during the final riveting and/or screwing process.

In order to finish the joint that is hermetically sealed by the surface seal 1, according to FIG. 4, through borings 14, 15 are initially produced in the first component 8, the second component 10 and the plastic film 2 with the pressure-sensitive adhesive layers 3, 4 arranged thereon, into which borings the rivets 16, 17 (or screws) are subsequently inserted so that the components 8, 10 inclusive the surface seal 1 that is arranged therebetween and is formed with the plastic film 2 having pressure-sensitive adhesive layers 3, 4 applied to both sides thereof are compressed under high pressure, i.e., contracted.

Due to the essentially pressure-resistant formation of the plastic film 2, the plastic film 2 according to the exemplary embodiment is not displaced from the regions of the bore edges 18, 19 so that fretting corrosion between the components 8, 10 is prevented and the risk of fatigue cracks initiated by this fretting corrosion is effectively precluded.

Instead of using rivets 16, 17, the components 8, 10 may also be joined, for example, with a conventional screw connection.

After the rivets 16, 17 and/or other suitable connecting elements are inserted, a hermetically sealed joint 20 is produced between the first and the second components 8, 10 with the aid of the inventive surface seal 1.

In order to hermetically seal the joint 20, the rivets 16, 17 are further provided with not-shown sealing elements, for example, in the form of a sufficiently viscous sealing compound.

Elements for detecting cracks 32 in the region of the surface seal 1 may be integrated into the region of the pressure-resistant plastic film 2. These elements 32 may be, for example, fine channels within the surface seal 1 that can be acted upon with a vacuum.

If a crack is formed, it would continue through the vacuum channels and the inflow of ambient air would lead to a pressure change that can be detected by a suitable measuring transducer.

Figure 5:
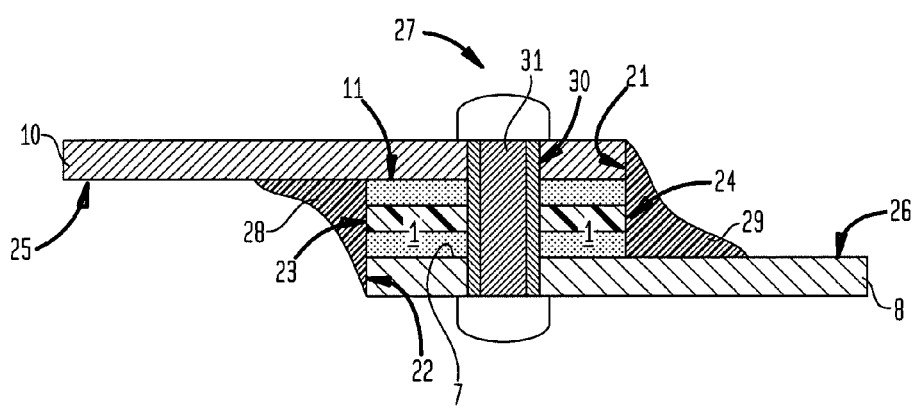
FIG. 5 shows a cross section through a riveted joint with additional sealing joints.

FIG. 5 shows a cross section through an exemplary embodiment of a joint. In contrast to the joint 20 according to FIG. 4, the component edges 21, 22 of the components 8, 10, the lateral surfaces 23, 24 of the surface seal 1 and the upper sides 25, 26 of the components are additionally covered with a sealing compound, that forms sealing joints 28, 29, in the region of the sealing surfaces 7, 11 of the joint 27. In the embodiment shown, the sealing joints 28, 29 form an essentially groove-shaped profile (hohlkehlförmiges Profil). It would also be conceivable to realize other cross-sectional geometries of the sealing joints 28, 29. The sealing joints 28, 29 prevent the lateral admission of moisture into the surface seal 1 and, if applicable, into the components 8, 10, wherein this aspect is of particular importance in components that are formed with plastics, for example, metal-CFRP composite materials or metal-GRP composite materials.

According to the illustration shown in FIG. 5, the first and the second component 8, 10 as well as the surface seal 1 lying therebetween are rigidly connected by a rivet 31 that is inserted into the through boring 30 in order to produce the joint 27.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

LIST OF REFERENCE SIGNS

| | |
|---|---|
| 1 | Surface seal |
| 2 | Pressure-resistant plastic film |
| 3 | Pressure-sensitive adhesive layer |
| 4 | Pressure-sensitive adhesive layer |
| 5 | Protective film |
| 6 | Protective film |
| 7 | Joining surface (first component) |
| 8 | First component |
| 9 | Pressing roller |
| 10 | Second component |
| 11 | Joining surface (second components) |
| 12 | Directional arrows |
| 13 | Directional arrows |
| 14 | Bore |
| 15 | Bore |
| 16 | Rivet |
| 17 | Rivet |
| 18 | Bore edge |
| 19 | Bore edge |
| 20 | Joint |
| 21 | Component edge (first component) |
| 22 | Component edge (second component) |
| 23 | Lateral surface (surface seal) |
| 24 | Lateral surface (surface seal) |
| 25 | Upper side (second component) |
| 26 | Upper side (first component) |
| 27 | Joint |
| 28 | Sealing joint |
| 29 | Sealing joint |
| 30 | Bore |
| 31 | Rivet |

The invention claimed is:

1. A sealed aircraft assembly comprising:
a joint between a first and a second component of the aircraft, the joint being at least one of a riveted joint and a screwed joint, the joint comprising:
a surface seal for sealing the joint between the first and the second component of the aircraft, the surface seal comprising
a pressure-resistant plastic film provided with a pressure-sensitive adhesive layer on both sides, wherein the pressure-resistant plastic film is formed from a pressure-resistant plastic material selected from the group consisting of polyimide, polytetrafluoroethylene, polycarbonate, and a combination thereof, and
wherein the surface seal is arranged in the region of joining surfaces of the first and the second components,
wherein at least one of the first component and the second component of the sealed aircraft assembly comprises at least one of an aircraft cabin pressure dome, a pressurized aircraft floor and a pressure bulkhead, and a support bar and a frame of the aircraft.

2. The assembly of claim 1, wherein the plastic film is strip-shaped.

3. The assembly of claim 1, wherein the surface seal comprises a substantially constant layer thickness of less than 1 mm and a width of less than 100 mm.

4. A method for producing a sealed aircraft assembly comprising at least one of a riveted or screwed joint between a first and a second component of an aircraft, wherein the joint is sealed with a surface seal comprising a pressure-resistant plastic film provided with a pressure-sensitive adhesive layer on both sides, wherein the pressure-resistant plastic film is formed from a pressure-resistant plastic material selected from the group consisting of polyimide, polytetrafluoroethylene, polycarbonate, and a combination thereof, and wherein the surface seal is arranged in the region of joining surfaces of the first and the second component, the method comprising:
- cleaning the first and the second component in the region of the joining surfaces;
- removing the protective film from one of the pressure-sensitive adhesive layers;
- applying the surface seal in the region of the joining surface of the first component;
- removing a protective film from the other pressure-sensitive adhesive layer;
- aligning and positioning the components on top of one another so that both components are adhesively joined; and
- final joining of the components by at least one of riveting or screwing;
- wherein at least one of the first component and the second component of the sealed aircraft assembly comprises at least one of an aircraft cabin pressure dome, a pressurized aircraft floor and a pressure bulkhead, and a support bar and a frame of the aircraft.

5. The method of claim 4, wherein the surface seal is pressed against the first component by a pressing roller after the application step.

6. The method of claim 4, wherein respective sealing joints are formed in the region of component edges.

7. The method of claim 4, wherein the first and the second components are fixed by a clamping device after being placed on top of one another, wherein the clamping device builds up a uniform pressure at least in the region of the joining surfaces in order to achieve good adhesion.

8. A sealed aircraft assembly comprising at least one of a riveted or screwed joint between a first and a second component of an aircraft, the joint comprising a surface seal for sealing the at least one of a riveted or screwed joint between the first and the second component of the aircraft, comprising:
- a pressure-resistant plastic film provided with a pressure-sensitive adhesive layer on both sides, wherein the pressure-resistant plastic film is formed from a pressure-resistant plastic material selected from the group consisting of polyimide, polytetrafluoroethylene, polycarbonate, and a combination thereof, and
- wherein the surface seal is arranged in the region of joining surfaces of the first and the second components,
- the joint further comprising at least one sealing joint formed in the region of the joining surfaces of the first and the second components,
- wherein the at least one sealing joint is formed from a different material than the pressure sensitive adhesive layers.

9. The assembly of claim 1,
- the joint further comprising at least one sealing joint formed in the region of the joining surfaces of the first and the second components,
- wherein the at least one sealing joint is formed from a different material than the pressure sensitive adhesive layers.

10. The assembly of claim 8, wherein the plastic film is strip-shaped.

11. The assembly of claim 8, wherein the surface seal comprises a substantially constant layer thickness of less than 1 mm and a width of less than 100 mm.

* * * * *